(12) United States Patent
Hamada et al.

(10) Patent No.: US 11,505,216 B2
(45) Date of Patent: Nov. 22, 2022

(54) TRANSFER CART

(71) Applicant: TSUBAKIMOTO CHAIN CO., Osaka (JP)

(72) Inventors: Motoshi Hamada, Ikeda (JP); Daiki Kondo, Ikeda (JP); Atsushi Nakagami, Osaka (JP); Yoshimasa Takahashi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 2 days.

(21) Appl. No.: 17/202,610

(22) Filed: Mar. 16, 2021

(65) Prior Publication Data
US 2021/0291879 A1   Sep. 23, 2021

(30) Foreign Application Priority Data

Mar. 23, 2020   (JP) .............................. JP2020-051437

(51) Int. Cl.
*B61B 10/04*   (2006.01)
*B62D 65/18*   (2006.01)
*B61B 10/00*   (2006.01)
*B65G 35/00*   (2006.01)

(52) U.S. Cl.
CPC .............. *B61B 10/04* (2013.01); *B62D 65/18* (2013.01); *B61B 10/00* (2013.01); *B65G 35/00* (2013.01)

(58) Field of Classification Search
CPC ......... B61B 10/04; B61B 10/00; B62D 65/18; B65G 35/00
See application file for complete search history.

(56) References Cited

U.S. PATENT DOCUMENTS

| | | | | |
|---|---|---|---|---|
| 3,944,258 A * | 3/1976 | Christensen | ........... | B62D 53/00 280/489 |
| 4,440,090 A * | 4/1984 | Murai | ..................... | B61B 10/04 104/127 |
| 5,014,625 A * | 5/1991 | Murai | .................... | B65G 23/23 105/176 |
| 6,324,992 B1 * | 12/2001 | Morikiyo | ................ | B61B 13/12 104/165 |
| 6,415,721 B1 * | 7/2002 | Morikiyo | ............... | B62D 65/18 104/137 |

(Continued)

FOREIGN PATENT DOCUMENTS

| | | |
|---|---|---|
| JP | 2-11456 A | 1/1990 |
| JP | H08-282480 A | 10/1996 |
| JP | 2609905 B2 | 5/1997 |

*Primary Examiner* — Ryan J. Walters
(74) *Attorney, Agent, or Firm* — WHDA, LLP

(57) ABSTRACT

Provided is a transfer cart that that has a simple structure, facilitates operation in front and back spaces of a moving direction, and does not take up a redundant transfer space in a locations where operation is not performed. The transfer cart includes a running frame, a main carrier capable of carrying thereon an object to be transferred, and moving-direction operation decks disposed at front and back of the moving direction on the main carrier and running frame. The moving-direction operation decks are configured to change angle with the main carrier in accordance with the radius of curvature of a track, and configured to have a variable height mechanism to be able to change height thereof in the up and down direction.

5 Claims, 2 Drawing Sheets

(56) References Cited

U.S. PATENT DOCUMENTS

| | | | | |
|---|---|---|---|---|
| 6,481,521 B2 * | 11/2002 | Sugiyama | ............ | B62D 53/005 180/22 |
| 6,494,142 B2 * | 12/2002 | Masugaki | .............. | B62D 65/18 104/168 |
| 6,679,185 B2 * | 1/2004 | Sullivan | ................ | B62D 65/18 188/129 |
| 2002/0074172 A1 * | 6/2002 | Sugiyama | ............ | B62D 53/005 180/22 |

* cited by examiner

RELATED ART

TRANSFER CART

BACKGROUND OF THE INVENTION

1. Field of the Invention

The present invention relates to a transfer cart movable along a predetermined track and used, for example, to support and transfer a body of an automobile while operators perform a process such as assembling on the body that is being transferred.

2. Description of the Related Art

When operators perform a process, such as assembling, on a body or the like of an automobile that is being supported and transferred along a predetermined track, in a case where the operation is simple and the moving speed in the operation is low, the operators implement the operation while the operators themselves are moving.

Another method is also employed in which the transfer is paused for a while to perform the operation, or in which an operation deck that moves at the same speed as the transfer cart is arranged to perform the operation.

For example, a moving operation deck as illustrated in FIG. 4 is known, in which a movement path of an operation deck 503 is set on the sides of the track of a transfer cart 500, and the operation deck 503 is moved in sync with the transfer cart 500.

Japanese Patent No. 2609905 describes another known transfer cart that includes an operation platform (operation deck) so as to surround a load placement platform (main carrier) on the upper side of the cart body (running frame).

SUMMARY OF THE INVENTION

The method in which the transfer is paused for a while to implement operation entails a problem of poor efficiency in a case of a drive method that causes all transfer carts to move simultaneously at constant speed, because the period of the pause varies depending on the operation.

In the case where operation decks 503 are moved in sync with the transfer cart 500 as illustrated in FIG. 4, it is difficult to cover at front and back of the transfer cart 500 in the moving direction.

Moreover, in the structure described in Japanese Patent No. 2609905, a space that the transfer cart occupies becomes larger, which creates a redundant transfer space taken up even in a location where operation is not performed.

Operation decks may be provided only at front and back of the transfer cart in the moving direction, however, in a case of a transfer track with varying gradient, a radius of curvature in the vertical direction cannot be made small, and a redundant transfer space is created inevitably.

An object of the present invention is to solve these problems and to provide a transfer cart that has a simple structure, facilitates operation in front and back spaces in a moving direction and does not take up a redundant transfer space in a location where operation is not performed.

To achieve the above object, the present invention provides a transfer cart movable along a predetermined track, the transfer cart including a running frame, a main carrier capable of carrying thereon an object to be transferred, and at least one operation deck. The operation deck includes a moving-direction operation deck disposed in one or both of the front and the back of the moving direction on the main carrier and running frame. The moving-direction operation deck is configured to change angle with the main carrier in accordance with a radius of curvature of a track and has a variable height mechanism to be able to change height thereof in an up and down direction.

The transfer cart of the present invention includes the moving-direction operation deck, which is configured to change angle with the main carrier in accordance with the radius of curvature of the track and gas the variable height mechanism to be able to change height thereof in the up and down direction. This configuration facilitates operation at the front or the back space of the moving direction, and does not take up a redundant transfer space in a location where operation is not performed, since it enables the moving-direction operation deck to avoid interference with stationary components or the object being transferred even when the track has a small radius of curvature in the vertical direction.

According to the configuration of the present invention, the variable height mechanism is operated by a guide rail provided along the track, which obviates the need to mount a drive power source on the transfer cart and makes the configuration even simpler.

According to the configuration of the present invention, the running frame includes at least one bendable part that bends in accordance with the radius of curvature of the track, and the at least one bendable part is interposed between the main carrier and the moving-direction operation deck. This gives a larger degree of freedom of change to the angle between the moving direction operation deck and the main carrier both in the horizontal and vertical directions, so that the space for transfer can be made even smaller.

According to the configuration of the present invention, the running frame includes a plurality of running parts having running wheels, and a coupling part coupled via the bendable part to the running parts. This enables the angle between the moving direction operation deck and the main carrier to vary smoothly in accordance with the radius of curvature of the track.

According to the configuration of the present invention, the running frame includes four running parts and three coupling parts each coupled via the bendable part to adjacent ones of the four running parts. The main carrier is supported on the center coupling part or two middle running parts, while the moving-direction operation decks are supported on the coupling parts on both ends. This enables the angle between the moving-direction operation decks and the main carrier to vary smoothly in accordance with the radius of curvature of the track, while allowing the main carrier to move in a stable manner.

DESCRIPTION OF THE PREFERRED EMBODIMENTS

Figure 1:
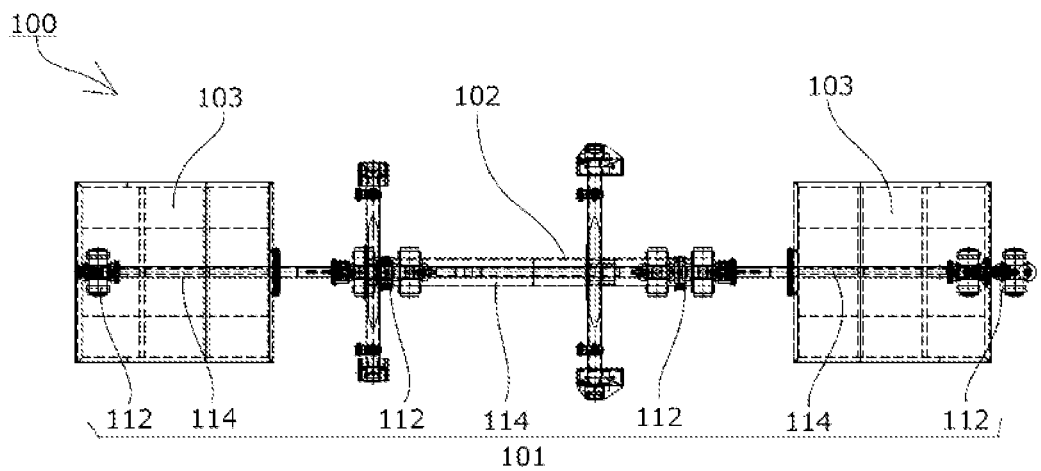
FIG. 1 is an illustrative plan view of a transfer cart 100 according to one embodiment of the present invention.
Figure 2:
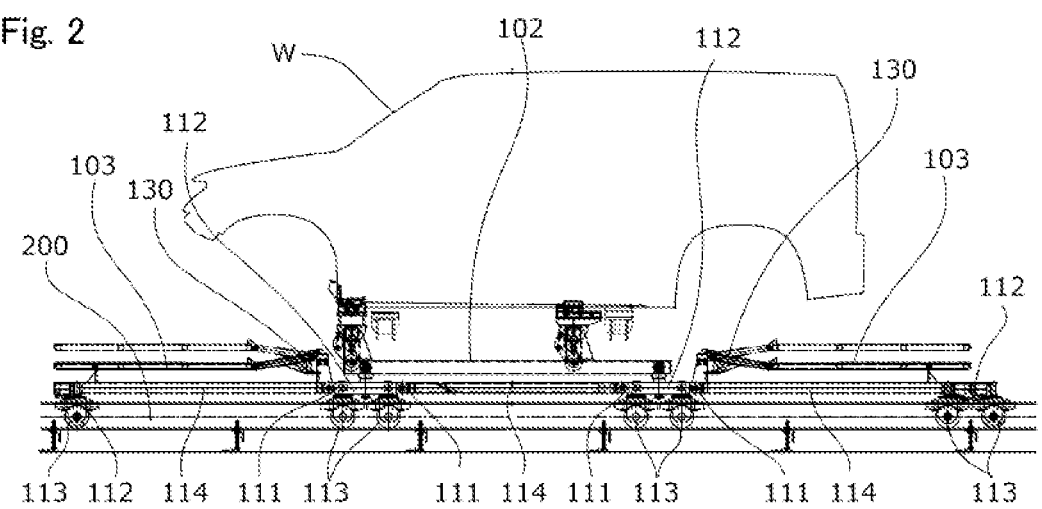
FIG. 2 is an illustrative side view of the transfer cart 100 according to one embodiment of the present invention.
Figure 3:
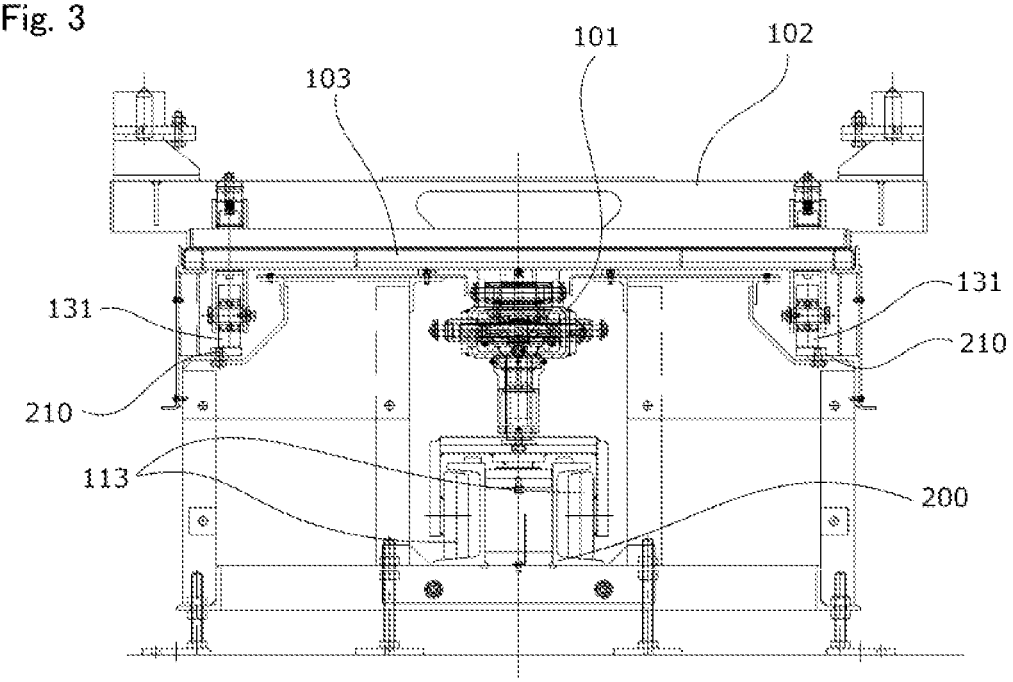
FIG. 3 is an illustrative front view of the transfer cart 100 according to one embodiment of the present invention.

A transfer cart 100 according to a first embodiment of the present invention includes a running frame 101, a main carrier 102 capable of carrying a body W of an automobile that is the object to be transferred placed thereon, and moving-direction operation decks 103 as illustrated in FIG. 1 to FIG. 3.

The moving-direction operation decks 103 are connected in series to the main carrier 102 on running frame 101. The moving-direction operation decks 103 are positioned both on the front and the back of the main carrier 102 in the moving direction.

The running frame 101 includes four running parts 112 having running wheels 113, and three coupling parts 114 each coupled between adjacent ones of the four running parts via bendable parts 111.

The main carrier 102 is supported on two middle running parts 112, while the front and back moving-direction operation decks 103 are each supported on the coupling parts 114 on both ends.

A plurality of the transfer carts 100, which are configured to be movable by running wheels 113 along a travel rail 200 arranged along a transfer track, are moved continuously at a predetermined rate by a known method (not shown).

The travel rail 200 includes curved parts and inclined parts both in the horizontal and vertical directions as required, and as the running wheels 113 roll on the travel rail 200, the entire transfer cart 100 moves along the travel rail 200, with the bendable parts 111 bending.

A guide rail may optionally be provided for facilitating the travel along the horizontal direction, in which case the running parts 112 may be provided with guide wheels.

A variable height mechanism is configured for the moving-direction operation decks 103 by height varying wheels 131 provided on the lower side of the operation decks and guide rails 210 installed parallel to the travel rail 200.

For a track where the moving direction operation decks 103 are not used, the guide rails 210 are not installed, and the moving-direction operation decks 103 are set in the lowest position.

For a track where the moving-direction operation decks 103 are used, the guide rails 210 are installed at a required height, so that the moving-direction operation decks 103 are kept at predetermined height in accordance with the movement of the transfer cart 100 without using another drive power source.

The height variable mechanism may optionally have a drive power source and may be activated by a suitable signal, or may allow the operator to adjust the height manually.

When the transfer track includes a curved part in the vertical direction between a horizontal part and an inclined part, the bendable parts 111 allow the angle between the moving direction operation decks 103 and the main carrier 102 to vary in accordance with the radius of curvature of the track. This configuration thus allows the transfer cart to pass by stationary components such as the travel rail 200 without interfering with them.

Moreover, the moving-direction operation decks 103 can be lowered by the height variable mechanism, so that the transfer cart can run on a track having a small radius of curvature without interfering with the body W.

While one embodiment of the present invention has been described above in detail, the present invention is not limited to the embodiment described above. Various design changes may be made without departing from the scope of the claims set forth in the claims.

For example, instead of providing the moving-direction operation decks 103 both in the front and the back as in the embodiment described above, the operation deck may be provided only on either one of the front and the back.

The variable height mechanism for the moving-direction operation decks 103 in the front and the back may be configured to be adjustable separately to different heights. For example, the moving-direction operation decks 103 in the front and the back may each have height varying wheels 131 installed at different positions as viewed from the front, with corresponding guide rails 210 set at different heights.

Figure 4:
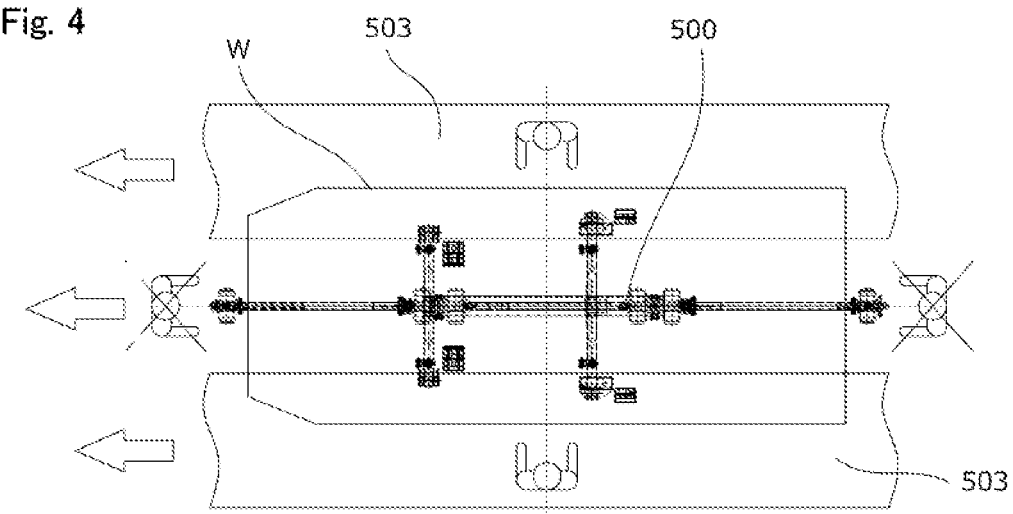
FIG. 4 is a diagram for reference of operation decks.

Although operation decks provided on one or both lateral sides of the moving direction have not been mentioned, it is also possible to fixedly provide a deck to one or both sides of the transfer cart 100 as long as it is configured to not interfere with the moving-direction operation decks 103. For example, a movement path of an operation deck may be set on one or both sides of the track of the transfer cart as illustrated in FIG. 4, and the operation deck may be moved in sync with the transfer cart.

What is claimed is:

1. A transfer cart movable along a predetermined track, the transfer cart comprising:
   a running frame;
   a main carrier capable of carrying thereon an object to be transferred; and
   at least one operation deck,
   the at least one operation deck including a moving-direction operation deck connected in series to the main carrier on the running frame at either one of or both of a front side and a rear side in a moving direction,
   the moving-direction operation deck being configured to change angle between the moving-direction operation deck and the main carrier in accordance with a radius of curvature of a track, the moving-direction operation deck having a variable height mechanism to be able to change height thereof in an up and down direction.

2. The transfer cart according to claim 1, wherein the variable height mechanism is configured to be operated with a guide rail provided along the track.

3. The transfer cart according to claim 1, wherein
   the running frame includes at least one bendable part that bends in accordance with the radius of curvature of the track, and
   the at least one bendable part is interposed between the main carrier and the moving-direction operation deck.

4. The transfer cart according to claim 3, wherein the running frame includes a plurality of running parts having running wheels, and a coupling part coupled via the bendable part to the running parts.

5. The transfer cart according to claim 4, wherein
   the main carrier is supported on the coupling part at a center position or two running parts at middle positions, and
   the moving-direction operation decks are supported by coupling parts at both ends.

* * * * *